United States Patent
Tranninger et al.

(10) Patent No.: US 11,952,482 B2
(45) Date of Patent: Apr. 9, 2024

(54) TRANSLUCENT POLYOLEFIN BLENDS ACHIEVING EXCELLENT IMPACT-STIFFNESS BALANCE AND FLOWABILITY

(71) Applicant: BOREALIS AG, Vienna (AT)

(72) Inventors: Cornelia Tranninger, Linz (AT); Daniela Mileva, Linz (AT); Georg Grestenberger, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 18/005,157

(22) PCT Filed: Jul. 8, 2021

(86) PCT No.: PCT/EP2021/068969
§ 371 (c)(1),
(2) Date: Jan. 11, 2023

(87) PCT Pub. No.: WO2022/013051
PCT Pub. Date: Jan. 20, 2022

(65) Prior Publication Data
US 2023/0257570 A1    Aug. 17, 2023

(30) Foreign Application Priority Data
Jul. 16, 2020   (EP) .................................... 20186191

(51) Int. Cl.
*C08L 23/16*    (2006.01)
*C08L 23/08*    (2006.01)

(52) U.S. Cl.
CPC .......... *C08L 23/16* (2013.01); *C08L 23/0815* (2013.01); *C08L 2205/025* (2013.01); *C08L 2205/03* (2013.01); *C08L 2207/02* (2013.01); *C08L 2207/066* (2013.01)

(58) Field of Classification Search
CPC ................ C08L 23/16; C08L 23/0815; C08L 2205/025; C08L 2207/02; C08L 2205/03
See application file for complete search history.

(56) References Cited

U.S. PATENT DOCUMENTS

| 10,907,036 | B2 | 2/2021 | Sandholzer et al. |
| 2016/0257809 | A1* | 9/2016 | Biondini .................. C08L 23/16 |
| 2020/0140668 | A1 | 5/2020 | Sandholzer et al. |
| 2022/0389204 | A1* | 12/2022 | Wang ........................ B29B 7/90 |

FOREIGN PATENT DOCUMENTS

| EP | 2275485 A1 | 1/2011 |
| EP | 2480606 A1 | 8/2012 |
| GB | 2568909 A | 6/2019 |
| RU | 2499804 C1 | 11/2013 |
| WO | 2010/142540 A1 | 12/2010 |
| WO | 2017/060139 A1 | 4/2017 |
| WO | 2017/117054 A1 | 7/2017 |
| WO | 2017/148970 A1 | 9/2017 |

OTHER PUBLICATIONS

Russian Office Action dated May 19, 2023.
Russian Search Report.
Busico, et al., "Alk-1-ene Polymerization in the Presence of a Monocyclopentadienyl Zirconium(IV) Acetamidinate Catalyst: Microstructural and Mechanistic Insights" Macromol. Rapid Commun. 2007, 28, 1128-1134.
Castignolles, et al., "Detection and quantification of branching in polyacrylates by size-exclusion chromatography (SEC) and melt-state 13C NMR spectroscopy" Polymer 5, 2009, 2373-2383.
H.N. Cheng, "13C Nmr Analysis of Ethylene-Propylene Rubbers", Macromolecules 1984, 17, 1950-1955.
Extended Search Report dated Nov. 30, 2020.
Xenia Filip, et al., "Heteronuclear decoupling under fast MAS by a rotor-synchronized Hahn-echo pulse train" Journal of Magentic Resonance 176, 2005, 239-243.
John M. Griffin, "Low-load rotor-synchronised Hahn-echo pulse train (RS-HEPT) 1H decoupling in solid-state NMR: factors affecting MAS spin-echo dephasing times", Magnetic Reson. Chem. 2007; 45: S198-S208.
Katja Klimke, et al. "Optimisation and Application of Polyolefin Branch Quantification by Melt-State 13C NMR Spectroscopy" Macromol. Chem. Phys. 2006, 207, 382-395.
Weixia Liu, et al., "Poly(ethylene-co-1-octene) Characterization by High-Temperature Multidimensional NMR at 750 MHz", Macromolecules 2001, 34, 4757-4767.
Gerhard Hubner, et al., "Application of Melt-State NMR Spectroscopy for Polyolefin Characterization in Industry", Chapter 24.
Matthew Parkinson, et al. "Effect of Branch Length on 13C NMR Relaxation Properties in Molten Poly[ethyleneco-(a-olefin)] Model Systems" Macromol. Chem Phys. 2007, 208, 2128-2133.
M. Pollard, et al. "Observation of Chain Branching in Polyethylene in the Solid State and Melt via 13C NMR Spectroscopy and Melt NMR Relaxation Time Measurements" Macromolecules 2004, 37, 813-825.

(Continued)

Primary Examiner — Jeffrey C Mullis
(74) Attorney, Agent, or Firm — TAROLLI, SUNDHEIM, COVELL & TUMMINO L.L.P.

(57) ABSTRACT

A heterophasic polypropylene composition (C) comprising: a. 60.0 to 85.0 wt.-% of a first heterophasic propylene ethylene copolymer (HECO1), having: i. 75.0 to 92.0 wt.-% of a CRYSTEX QC crystalline fraction (CF); ii. 8.0 to 25.0 wt.-% of a CRYSTEX QC soluble fraction (SF); iii. an IV(SF) of 2.00 to 4.00 dl/g; b. 5.0 to 20.0 wt.-% of a second heterophasic propylene ethylene copolymer (HECO2), having i. 15.0 to 30.0 wt.-% of a CRYSTEX QC soluble fraction (SF); ii. an IV(SF) of 2.5 to 5.0 dl/g; and c. 5.0 to 20.0 wt.-% of a polymer of ethylene (PE), being selected from an ethylene-based plastomer and an LDPE, having a density in the range from 895 to 925 kg/m$^3$; wherein the heterophasic polypropylene composition (C) has an MFR2 in the range from 15.0 to 40.0 g/10 min, and 5.0 to 23.0 wt.-% of a CRYSTEX QC soluble fraction (SF).

16 Claims, 1 Drawing Sheet

(56) References Cited

OTHER PUBLICATIONS

XiaoHua Qiu, et al., "Improved Peak Assignments for the 13C NMR Spectra of Poly(ethylene-co-1-octene)s" Macromolecules 2007, 40, 6879-6884.
Randoll Macromol. Chem Phys. 1989 C29 201.
Gurmeet Singh, et al., "Triad sequence determination of ethylene-propylene copolymers—application of quantitative 13C NMR" Polymer Testing 28 (2009) 475-479.
Wen-Jun Wang, et al., "Structural Analysis of Ethylene/Propylene Copolymers Synthesized with a Constrained Geometry Catalyst" Macromolecules 2000, 33, 1157-1162.
Zhe Zhou, et al., "A new decoupling method for accurate quantification of polyethylene copolymer composition and triad sequence distribution with 13C NMR" Journal of Magnetic Resonance 187 (2007) 225-233.

* cited by examiner

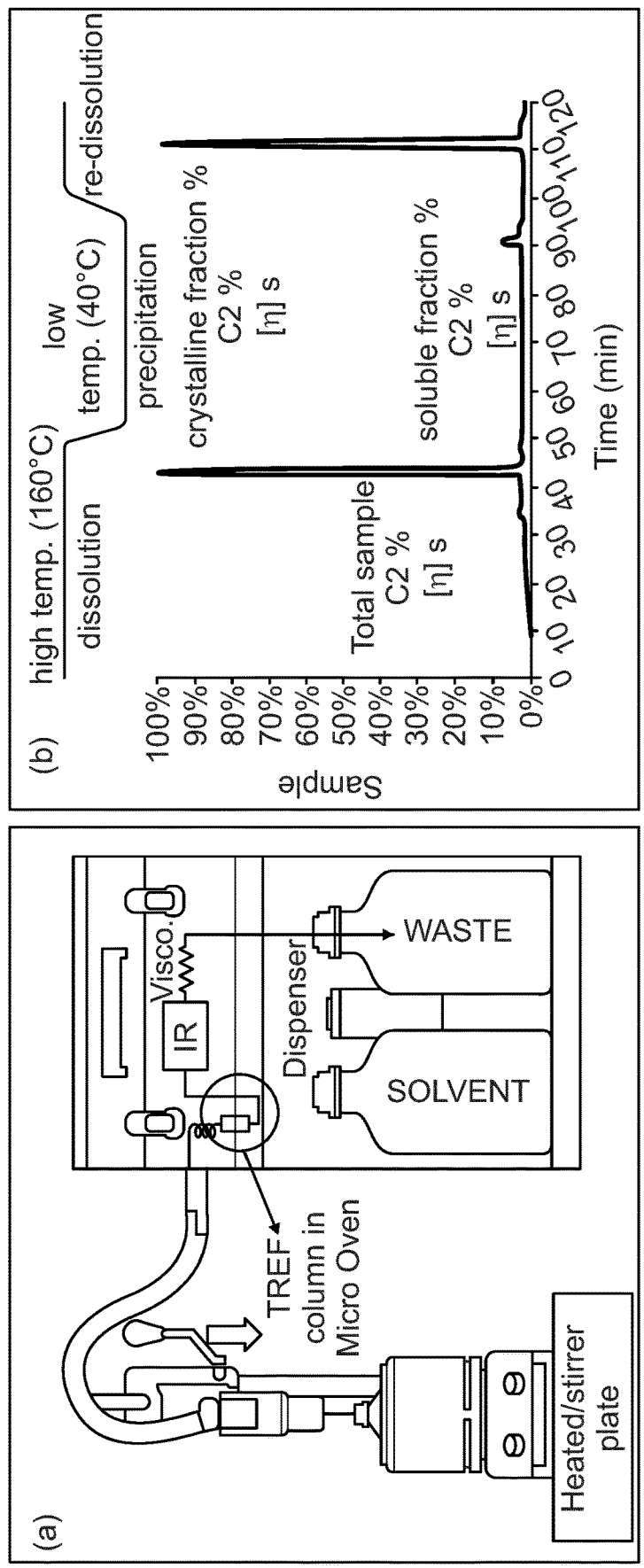
(a) Schematic diagram of the CRYSTEX QC instrument (b) Elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene

TRANSLUCENT POLYOLEFIN BLENDS ACHIEVING EXCELLENT IMPACT-STIFFNESS BALANCE AND FLOWABILITY

The present invention relates to a heterophasic polypropylene composition with good total luminous transmittance and a beneficial balance of stiffness and impact properties, as well as articles made therefrom.

BACKGROUND TO THE INVENTION

Polymers, like polypropylene, are increasingly used in different demanding applications. At the same time, there is a continuous search for tailored polymers that meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. It is known that impact strength of polypropylene can be improved by dispersing a rubber phase within the polymer matrix, thereby obtaining a heterophasic polypropylene composition.

Such heterophasic propylene copolymers comprise a matrix being either a propylene homopolymer or a random propylene copolymer in which an amorphous phase, which contains a propylene copolymer rubber (elastomer), is dispersed. Thus, the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high-resolution microscopy, like electron microscopy, scanning force microscopy or atomic force microscopy.

Heterophasic polypropylene compositions have long been used for automotive applications, due to their beneficial mechanical properties, including beneficial balances of stiffness and impact strength (as indicated by Charpy or Izod impact strength parameters, and also puncture energy). Sensors and light emitting diodes (LEDs) have been used in cars for many years, but due to emerging trends such as autonomous driving, more and more sensors will need to be integrated into vehicles in the near future. For aesthetic reasons, it is preferable that the sensors and/or LEDs are not visible to the naked eye, however the function of the component (either sensing or emitting light) should not be impaired. As such, translucent polypropylene blends have great potential for application in such systems. There remains, however, a need for translucent polypropylene blends that have optimal mechanical properties in addition to suitable optical properties.

There are numerous disclosures of heterophasic polypropylene compositions for automotive applications, however the object of the present invention, i.e. obtaining a beneficial balance of optical (in particular total luminous transmittance) and mechanical properties (in particular impact properties), has not yet been sufficiently resolved.

WO 2017/117054 A1 discloses a blend of heterophasic propylene ethylene copolymers with propylene homopolymers for obtaining improved haze properties, although no indication is given of the total luminous transmittance.

EP 2 275 485 A1 describes a heterophasic polypropylene composition having improved mechanical properties, though, inter alia, the use of 10 wt.-% of mineral fillers.

EP 2 480 606 A1 describes a heterophasic polypropylene composition with high melt flow rates and low C2 content.

SUMMARY OF THE INVENTION

The present invention is based upon the finding that a heterophasic polypropylene composition (C), comprising a first heterophasic propylene ethylene copolymer (HECO1), a second heterophasic propylene ethylene copolymer (HECO2) and a polymer of ethylene (PE), has an improved balance of stiffness and impact strength, as well as good total luminous transmittance, whilst maintaining favorable properties in other areas, such as processability.

The present invention is directed to a heterophasic polypropylene composition (C) comprising:
a. 60.0 to 85.0 wt.-% of a first heterophasic propylene ethylene copolymer (HECO1), having:
  i. a crystalline fraction (CF) determined according to CRYSTEX QC method ISO 6427-B, present in an amount in the range from 75.0 to 92.0 wt.-%, relative to the total weight of HECO1;
  ii. a soluble fraction (SF) determined according to CRYSTEX QC method ISO 6427-B, present in an amount in the range from 8.0 to 25.0 wt.-%, relative to the total weight of HECO1;
  iii. an intrinsic viscosity of the soluble fraction (IV (SF)) in the range from 2.00 to 4.00 dl/g;
b. 5.0 to 20.0 wt.-% of a second heterophasic propylene ethylene copolymer (HECO2), being different to the first heterophasic propylene ethylene copolymer (HECO1), having
  i. a soluble fraction (SF) determined according to CRYSTEX QC method ISO 6427-B, present in amount in the range from 15.0 to 30.0 wt.-%, relative to the total weight of HECO2;
  ii. an intrinsic viscosity of the soluble fraction (IV(SF)) in the range from 2.5 to 5.0 dl/g; and
c. 5.0 to 20.0 wt.-% of a polymer of ethylene (PE), being selected from an ethylene-based plastomer and an LDPE, having a density in the range from 895 to 925 kg/m$^3$;

wherein the heterophasic polypropylene composition (C) has a melt flow rate MFR$_2$, measured according to ISO 1133-1 at 230° C. at a load of 2.16 kg, in the range from 15.0 to 40.0 g/10 min, and a soluble fraction (SF) determined according to CRYSTEX QC method ISO 6427-B, present in an amount in the range from 5.0 to 23.0 wt.-% relative to the total weight of the heterophasic polypropylene composition (C), and
wherein the combined amounts of the first heterophasic propylene ethylene copolymer (HECO1), the second heterophasic propylene ethylene copolymer (HECO2) and the polymer of ethylene (PE) are greater than or equal to 95 wt.-%, relative to the total weight of the heterophasic polypropylene composition (C).

In a further aspect, the present invention is directed to an injection-moulded article, comprising the heterophasic polypropylene composition (C) as described above, preferably wherein the injection-moulded article is an automotive article.

Definitions

A polymer blend is meant as mixture of two or more polymeric components. In general the blend can be prepared by mixing the two or more polymeric components. Suitable mixing procedures known in the art are in-situ blending during the polymerization process and post-polymerization blendings. During in-situ-blending the polymeric components produced in different stages of a multistage polymerisation process are blended by polymerizing one polymeric component in the presence of another polymeric component polymerized in a prior stage. Post-polymerization blendings can be dry-blendings of polymeric components such as polymer powders and/or compounded polymer pellets or melt blending by melt mixing the polymeric components. In the present invention the polymer blend is preferably prepared by post-polymerization blending of the polymeric components.

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. In case of a random heterophasic propylene copolymer, said crystalline matrix phase is a random copolymer of propylene and at least one alpha-olefin comonomer.

The elastomeric phase can be a propylene copolymer with a high amount of comonomer that is not randomly distributed in the polymer chain but is distributed in a comonomer-rich block structure and a propylene-rich block structure. A heterophasic polypropylene usually differentiates from a one-phasic propylene copolymer in that it shows two distinct glass transition temperatures Tg which are attributed to the matrix phase and the elastomeric phase.

A plastomer is a polymer that combines the qualities of elastomers and plastics, such as rubber-like properties with the processing abilities of plastic.

An ethylene-based plastomer is a plastomer with a molar majority of ethylene monomer units.

Whilst low density polyethylenes (LDPEs) do characteristically have a low density (typically 910 to 940 kg/m$^3$), in the context of the present invention LDPEs are characterized as being the result of high-pressure radical polymerization processes, thus having a significant branched character, as opposed to linear low density polyethylenes (LLDPEs), which have a similarly low density without the branched character, due to the use of transition metal-based polymerization catalysts employed.

DETAILED DESCRIPTION OF THE INVENTION

The heterophasic polypropylene composition (C) of the present invention comprises a first heterophasic propylene ethylene copolymer (HECO1), a second heterophasic propylene ethylene copolymer (HECO2) and a polymer of ethylene (PE), each having the properties as given in the following sections and in the amounts specified below.

The First Heterophasic Propylene Ethylene Copolymer (HECO1)

The first heterophasic propylene ethylene copolymer (HECO1) according to the present invention is present in an amount in the range from 60.0 to 85.0 wt.-%, more preferably in an amount in the range from 65.0 to 82.0 wt.-%, still more preferably in an amount in the range from 70.0 to 80.0 wt.-%, most preferably in the range from 74.0 to 78.0 wt.-%, relative to the total weight of the heterophasic polypropylene composition (C).

The first heterophasic propylene ethylene copolymer (HECO1) has a crystalline fraction (CF) determined according to CRYSTEX QC method ISO 6427-B, present in an amount in the range from 75.0 to 92.0 wt.-%, more preferably 78.0 to 90.0 wt.-%, still more preferably in the range from 81.0 to 88.0 wt.-%, most preferably in the range from 83.0 to 86.0 wt.-%, relative to the total weight of the first heterophasic propylene ethylene copolymer (HECO1).

The crystalline fraction (CF) of the first heterophasic propylene ethylene copolymer (HECO1) preferably has an intrinsic viscosity (IV(CF)) in the range from 1.00 to 2.00 dl/g, more preferably in the range from 1.10 to 1.80 dl/g, still more preferably in the range from 1.20 to 1.60 dl/g, most preferably in the range from 1.25 to 1.50 dl/g.

The crystalline fraction (CF) of the first heterophasic propylene ethylene copolymer (HECO1) preferably has an ethylene content (C2(CF)), measured by Infrared Spectroscopy during CRYSTEX analysis, in the range from 0.5 to 5.0 wt.-%, more preferably from in the range from 1.0 to 4.0 wt.-%, still more preferably in the range from 1.3 to 3.0 wt.-%, most preferably in the range from 1.5 to 2.0 wt.-%.

The first heterophasic propylene ethylene copolymer (HECO1) has a soluble fraction (SF) determined according to CRYSTEX QC method ISO 6427-B, present in an amount in the range from 8.0 to 25.0 wt.-%, more preferably in the range from 10.0 to 22.0 wt.-%, still more preferably in the range from 12.0 to 19.0 wt.-%, most preferably in the range from 14.0 to 17.0 wt.-%, relative to the total weight of the first heterophasic propylene ethylene copolymer (HECO1).

The soluble fraction (SF) of the first heterophasic propylene ethylene copolymer (HECO1) has an intrinsic viscosity (IV(SF)) in the range from 2.00 to 4.00 dl/g, more preferably in the range from 2.30 to 3.70 dl/g, still more preferably in the range from 2.50 to 3.50 dl/g, most preferably in the range from 2.60 to 3.30 dl/g.

The soluble fraction (SF) of the first heterophasic propylene ethylene copolymer (HECO1) preferably has an ethylene content (C2(SF)), measured by Infrared Spectroscopy during CRYSTEX analysis, in the range from 20.0 to 60.0 wt.-%, more preferably in the range from 25.0 to 50.0 wt.-%, still more preferably in the range from 30.0 to 40.0 wt.-%, most preferably in the range from 34.0 to 38.0 wt.-%.

The ratio of the intrinsic viscosity of the soluble fraction to the intrinsic viscosity of the crystalline fraction (IV(SF)/IV(CF)) of the first heterophasic propylene ethylene copolymer (HECO1) is preferably in the range from 1.00 to 3.00, more preferably in the range from 1.30 to 2.70, still more preferably in the range from 1.60 to 2.40, most preferably in the range from 1.80 to 2.20.

The first heterophasic propylene ethylene copolymer (HECO1) preferably has a xylene cold soluble fraction (XCS) determined according to ISO 16152 at 25° C., present in an amount in the range from 8.0 to 25.0 wt.-%, more preferably in the range from 10.0 to 22.0 wt.-%, still more preferably in the range from 12.0 to 19.0 wt.-%, most preferably in the range from 14.0 to 17.0 wt.-%, relative to the total weight of the first heterophasic propylene ethylene copolymer (HECO1).

The xylene cold soluble fraction (XCS) of the first heterophasic propylene ethylene copolymer (HECO1) preferably has an intrinsic viscosity (IV(XCS)) in the range from 2.00 to 4.00 dl/g, more preferably in the range from 2.30 to 3.70 dl/g, still more preferably in the range from 2.50 to 3.40 dl/g, most preferably in the range from 2.70 to 3.30 dl/g.

The xylene cold soluble fraction (XCS) of the first heterophasic propylene ethylene copolymer (HECO1) preferably has an ethylene content (C2(XCS)), measured by Infrared Spectroscopy during CRYSTEX analysis, in the range from 20.0 to 60.0 wt.-%, more preferably in the range from 25.0 to 50.0 wt.-%, still more preferably in the range from 30.0 to 45.0 wt.-%, most preferably in the range from 35.0 to 40.0 wt.-%.

The first heterophasic propylene ethylene copolymer (HECO1) preferably has a total ethylene content (C2), measured by in the range from 3.0 to 15.0 wt.-%, more preferably in the range from 4.0 to 12.0 wt.-%, still more preferably in the range from 5.0 to 10.0 wt.-%, most preferably in the range from 6.0 to 8.0 wt.-%.

The first heterophasic propylene ethylene copolymer (HECO1) preferably has a melt flow rate $MFR_2$, measured according to ISO 1133-1 at 230° C. at a load of 2.16 kg, in the range from 15.0 to 50.0 g/10 min, more preferably in the range from 20.0 to 45.0 g/10 min, still more preferably in the range from 25.0 to 43.0 g/10 min, most preferably in the range from 30.0 to 40.0 g/10 min.

The first heterophasic propylene ethylene copolymer (HECO1) can be polymerized via methods well known in the art, or alternatively may be a commercially available polypropylene grade. It would be understood that commercially available grades would be likely to contain common additives and nucleating agents, which may contribute to the total ash content of the heterophasic polypropylene composition (C).

The Second Heterophasic Propylene Ethylene Copolymer (HECO2)

The second heterophasic propylene ethylene copolymer (HECO2) is different to the first heterophasic propylene ethylene copolymer (HECO1), meaning that at least one of the properties used to define the heterophasic propylene ethylene copolymers HECO1 and HECO2 must differ.

The second heterophasic propylene ethylene copolymer (HECO2) according to the present invention is present in an amount in the range from 5.0 to 20.0 wt.-%, more preferably in an amount in the range from 7.0 to 18.0 wt.-%, still more preferably in an amount in the range from 9.0 to 16.0 wt.-%, most preferably in the range from 10.0 to 14.0 wt.-%, relative to the total weight of the heterophasic polypropylene composition (C).

The second heterophasic propylene ethylene copolymer (HECO2) preferably has a melt flow rate $MFR_2$, measured according to ISO 1133-1 at 230° C. at a load of 2.16 kg, in the range from 1.0 g/10 min to 20.0 g/10 min, more preferably in the range from 2.0 to 17.0 g/10 min, still more preferably in the range from 3.0 to 15.0 g/10 min, most preferably in the range from 4.0 to 13.0 g/10 min.

The second heterophasic propylene ethylene copolymer (HECO2) preferably has a total ethylene content (C2), measured by in the range from 8.0 to 15.0 wt.-%, more preferably in the range from 9.0 to 13.0 wt.-%, still more preferably in the range from 9.5 to 12.0 wt.-%, most preferably in the range from 10.0 to 11.5 wt.-%.

The second heterophasic propylene ethylene copolymer (HECO2) has a soluble fraction (SF) determined according to CRYSTEX QC method ISO 6427-B, present in an amount in the range from 15.0 to 30.0 wt.-%, more preferably in the range from 17.0 to 28.0 wt.-%, still more preferably in the range from 19.0 to 26.0 wt.-%, most preferably in the range from 20.0 to 24.0 wt.-%, relative to the total weight of the second heterophasic propylene ethylene copolymer (HECO2).

The soluble fraction (SF) of the second heterophasic propylene ethylene copolymer (HECO2) has an intrinsic viscosity (IV(SF)) in the range from 2.50 to 5.00 dl/g, more preferably in the range from 2.70 to 4.00 dl/g, still more preferably in the range from 2.90 to 3.50 dl/g, most preferably in the range from 3.10 to 3.40 dl/g.

The soluble fraction (SF) of the second heterophasic propylene ethylene copolymer (HECO2) preferably has an ethylene content (C2(SF)), measured by Infrared Spectroscopy during CRYSTEX analysis, in the range from 20.0 to 60.0 wt.-%, more preferably in the range from 25.0 to 50.0 wt.-%, still more preferably in the range from 30.0 to 45.0 wt.-%, most preferably in the range from 35.0 to 40.0 wt.-%.

The second heterophasic propylene ethylene copolymer (HECO2) consequently has a crystalline fraction (CF) determined according to CRYSTEX QC method ISO 6427-B, present in an amount in the range from 70.0 to 85.0 wt.-%, more preferably 72.0 to 83.0 wt.-%, still more preferably in the range from 74.0 to 81.0 wt.-%, most preferably in the range from 76.0 to 80.0 wt.-%, relative to the total weight of the second heterophasic propylene ethylene copolymer (HECO2).

The crystalline fraction (CF) of the second heterophasic propylene ethylene copolymer (HECO2) preferably has an intrinsic viscosity (IV(CF)) in the range from 1.00 to 2.50 dl/g, more preferably in the range from 1.20 to 2.30 dl/g, still more preferably in the range from 1.40 to 2.20 dl/g, most preferably in the range from 1.50 to 2.10 dl/g.

The crystalline fraction (CF) of the second heterophasic propylene ethylene copolymer (HECO2) preferably has an ethylene content (C2(CF)), measured by Infrared Spectroscopy during CRYSTEX analysis, in the range from 0.5 to 7.0 wt.-%, more preferably from in the range from 1.5 to 6.0 wt.-%, still more preferably in the range from 2.0 to 5.0 wt.-%, most preferably in the range from 2.5 to 4.5 wt.-%.

The ratio of the intrinsic viscosity of the soluble fraction to the intrinsic viscosity of the crystalline fraction (IV(SF)/IV(CF)) of the second heterophasic propylene ethylene copolymer (HECO2) is preferably in the range from 1.00 to 3.00, more preferably in the range from 1.20 to 2.70, still more preferably in the range from 1.40 to 2.40, most preferably in the range from 1.50 to 2.10.

The first heterophasic propylene ethylene copolymer (HECO2) preferably has a xylene cold soluble fraction (XCS) determined according to ISO 16152B, present in an amount in the range from 15.0 to 30.0 wt.-%, more preferably in the range from 17.0 to 28.0 wt.-%, still more preferably in the range from 19.0 to 26.0 wt.-%, most preferably in the range from 21.0 to 24.0 wt.-%, relative to the total weight of the second heterophasic propylene ethylene copolymer (HECO2).

The xylene cold soluble fraction (XCS) of the second heterophasic propylene ethylene copolymer (HECO2) preferably has an intrinsic viscosity (IV(XCS)) in the range from 2.50 to 5.00 dl/g, more preferably in the range from 2.80 to 4.50 dl/g, still more preferably in the range from 3.10 to 4.00 dl/g, most preferably in the range from 3.40 to 3.80 dl/g.

The xylene cold soluble fraction (XCS) of the second heterophasic propylene ethylene copolymer (HECO2) preferably has an ethylene content (C2(XCS)), measured by Infrared Spectroscopy during CRYSTEX analysis, in the range from 20.0 to 60.0 wt.-%, more preferably in the range from 25.0 to 55.0 wt.-%, still more preferably in the range from 30.0 to 50.0 wt.-%, most preferably in the range from 33.0 to 48.0 wt.-%.

The ratio of the melt flow rates $MFR_2$, measured according to ISO 1133-1 at 230° C. at a load of 2.16 kg, of the first and second heterophasic propylene ethylene copolymers ($MFR_2$(HECO1)/$MFR_2$(HECO2)) is preferably at least 2.0, more preferably in the range from 2.0 to 20.0, yet more preferably in the range from 2.30 to 16.0, still more preferably in the range from 2.60 to 13.0, most preferably in the range from 2.90 to 10.0.

The second heterophasic propylene ethylene copolymer (HECO2) can be polymerized via methods well known in the art, or alternatively may be a commercially available polypropylene grade. It would be understood that commercially available grades would be likely to contain common additives and nucleating agents, which may contribute to the total ash content of the heterophasic polypropylene composition (C).

The Polymer of Ethylene (PE)

The polymer of ethylene (PE) according to the present invention is present in an amount in the range from 5.0 to 20.0 wt.-%, more preferably in an amount in the range from 6.0 to 17.0 wt.-%, still more preferably in an amount in the range from 7.0 to 14.0 wt.-%, most preferably in the range from 8.0 to 12.0 wt.-%, relative to the total weight of the heterophasic polypropylene composition (C).

The polymer of ethylene (PE) has a density in the range from 895 to 925 kg/m$^3$, more preferably in the range from 989 to 922 kg/m$^3$, still more preferably in the range from 900 to 919 kg/m$^3$, most preferably in the range from 901 to 917 kg/m$^3$.

The polymer of ethylene (PE) preferably has a melt flow rate MFR$_2$, measured according to ISO 1133-1 at 190° C. at a load of 2.16 kg, in the range from 0.5 g/10 min to 30.0 g/10 min, more preferably in the range from 0.6 to 25.0 g/10 min, still more preferably in the range from 0.8 to 20.0 g/10 min, most preferably in the range from 1.0 to 18.0 g/10 min.

In the broadest sense, the polymer of ethylene (PE) can be selected from any low density polyethylene or ethylene-based plastomer that fulfils the properties given above.

In one preferred embodiment, the polymer of ethylene (PE) is a low density polyethylene (LDPE).

In said embodiment, the low density polyethylene (LDPE) preferably has a melt flow rate MFR$_2$, measured according to ISO 1133-1 at 190° C. at a load of 2.16 kg, in the range from 10.0 g/10 min to 30.0 g/10 min, more preferably in the range from 11.0 to 25.0 g/10 min, still more preferably in the range from 12.0 to 20.0 g/10 min, most preferably in the range from 13.0 to 18.0 g/10 min.

In said embodiment, the low density polyethylene (LDPE) preferably has a density in the range from 908 to 925 kg/m$^3$, more preferably in the range from 910 to 922 kg/m$^3$, still more preferably in the range from 912 to 919 kg/m$^3$, most preferably in the range from 913 to 917 kg/m$^3$.

In an alternative embodiment, the polymer of ethylene (PE) is an ethylene-based plastomer (PL).

In said embodiment, the ethylene-based plastomer (PL) preferably has a melt flow rate MFR$_2$, measured according to ISO 1133-1 at 190° C. at a load of 2.16 kg, in the range from 0.5 g/10 min to 10.0 g/10 min, more preferably in the range from 0.6 to 7.0 g/10 min, still more preferably in the range from 0.8 to 5.0 g/10 min, most preferably in the range from 1.0 to 3.0 g/10 min.

In said embodiment, the ethylene-based plastomer (PL) preferably has a density in the range from 895 to 908 kg/m$^3$, more preferably in the range from 989 to 906 kg/m$^3$, still more preferably in the range from 900 to 905 kg/m$^3$, most preferably in the range from 901 to 904 kg/m$^3$.

In said embodiment, the ethylene-based plastomer (PL) preferably comprises comonomer(s) selected from C3 to C10 alpha olefins, more preferably from C4 to C8 alpha olefins, still more preferably from 1-hexene or 1-octene, most preferably 1-octene.

It is particularly preferred that the ethylene-based plastomer (PL) contains 1-octene as the only comonomer(s).

In said embodiment, the ethylene-based plastomer preferably has a comonomer content, measured by quantitative $^{13}$C-NMR analysis, in the range from 3.0 to 6.0 mol-%, more preferably in the range from 4.0 to 5.5 mol-%, still more preferably in the range from 4.3 to 5.3 mol-%, most preferably in the range from 4.5 to 5.0 mol-%.

The polymer of ethylene (PE) can be polymerized via methods well known in the art, or alternatively may be a commercially available polyethylene grade. It would be understood that commercially available grades would be likely to contain common additives and nucleating agents, which may contribute to the total ash content of the heterophasic polypropylene composition (C).

The Heterophasic Polypropylene Composition (C)

The heterophasic polypropylene composition (C) according to the present invention comprises 60.0 to 85.0 wt.-% of the first heterophasic propylene ethylene copolymer (HECO1), 5.0 to 20.0 wt.-% of the second heterophasic propylene ethylene copolymer (HECO2) and 5.0 to 20.0 wt.-% of the polymer of ethylene (PE).

In a preferred embodiment, the heterophasic polypropylene composition (C) comprises 65.0 to 82.0 wt.-% of the first heterophasic propylene ethylene copolymer (HECO1), 7.0 to 18.0 wt.-% of the second heterophasic propylene ethylene copolymer (HECO2) and 6.0 to 17.0 wt.-% of the polymer of ethylene (PE).

In a further preferred embodiment, the heterophasic polypropylene composition (C) comprises 70.0 to 80.0 wt.-% of the first heterophasic propylene ethylene copolymer (HECO1), 9.0 to 16.0 wt.-% of the second heterophasic propylene ethylene copolymer (HECO2) and 7.0 to 14.0 wt.-% of the polymer of ethylene (PE).

In a yet further preferred embodiment, the heterophasic polypropylene composition (C) comprises 74.0 to 78.0 wt.-% of the first heterophasic propylene ethylene copolymer (HECO1), 10.0 to 14.0 wt.-% of the second heterophasic propylene ethylene copolymer (HECO2) and 8.0 to 12.0 wt.-% of the polymer of ethylene (PE).

In each of the embodiments, the combined amounts of the first heterophasic propylene ethylene copolymer (HECO1), the second heterophasic propylene ethylene copolymer (HECO2) and the polymer of ethylene (PE) are greater than or equal to 95 wt.-%, relative to the total weight of the heterophasic polypropylene composition (C).

The heterophasic polypropylene composition (C) has a melt flow rate MFR$_2$, measured according to ISO 1133-1 at 230° C. at a load of 2.16 kg, in the range from 15.0 to 40.0 g/10 min, more preferably in the range from 16.0 to 35.0 g/10 min, still more preferably in the range from 17.0 to 30.0 g/10 min, most preferably in the range from 18.0 to 25.0 g/10 min. The heterophasic polypropylene composition (C) has a crystalline fraction (CF) determined according to CRYSTEX QC method ISO 6427-B, present in an amount in the range from 77.0 to 95.0 wt.-%, more preferably 80.0 to 90.0 wt.-%, still more preferably in the range from 82.0 to 88.0 wt.-%, most preferably in the range from 83.0 to 86.0 wt.-%, relative to the total weight of heterophasic polypropylene composition (C).

The crystalline fraction (CF) of the heterophasic polypropylene composition (C) preferably has an intrinsic viscosity (IV(CF)) in the range from 1.00 to 2.00 dl/g, more preferably in the range from 1.20 to 2.00 dl/g, still more preferably in the range from 1.30 to 1.80 dl/g, most preferably in the range from 1.40 to 1.60 dl/g.

The crystalline fraction (CF) of the heterophasic polypropylene composition (C) preferably has an ethylene content (C2(CF)), measured by Infrared Spectroscopy during CRYSTEX analysis, in the range from 5.0 to 20.0 wt.-%, more preferably from in the range from 7.0 to 17.0 wt.-%, still more preferably in the range from 9.0 to 15.0 wt.-%, most preferably in the range from 10.0 to 13.0 wt.-%.

The heterophasic polypropylene composition (C) has a soluble fraction (SF) determined according to CRYSTEX QC method ISO 6427-B, present in an amount in the range from 5.0 to 23.0 wt.-%, more preferably in the range from 10.0 to 20.0 wt.-%, still more preferably in the range from 13.0 to 18.0 wt.-%, most preferably in the range from 15.0 to 17.0 wt.-%, relative to the total weight of heterophasic polypropylene composition (C).

The soluble fraction (SF) of the heterophasic polypropylene composition (C) preferably has an intrinsic viscosity (IV(SF)) in the range from 2.00 to 3.50 dl/g, more preferably in the range from 2.30 to 3.20 dl/g, still more preferably in the range from 2.50 to 3.00 dl/g, most preferably in the range from 2.60 to 2.80 dl/g.

The soluble fraction (SF) of the heterophasic polypropylene composition (C) preferably has an ethylene content (C2(SF)), measured by Infrared Spectroscopy during CRYSTEX analysis, in the range from 25.0 to 50.0 wt.-%, more preferably in the range from 30.0 to 45.0 wt.-%, still more preferably in the range from 33.0 to 40.0 wt.-%, most preferably in the range from 35.0 to 37.0 wt.-%.

The ratio of the intrinsic viscosity of the soluble fraction to the intrinsic viscosity of the crystalline fraction (IV(SF)/IV(CF)) of the heterophasic polypropylene composition (C) is preferably in the range from 1.40 to 3.00, more preferably in the range from 1.50 to 2.50, still more preferably in the range from 1.60 to 2.20, most preferably in the range from 1.70 to 2.00.

The heterophasic polypropylene composition (C) preferably has a total ethylene content (C2), measured by in the range from 10.0 to 20.0 wt.-%, more preferably in the range from 12.0 to 18.0 wt.-%, still more preferably in the range from 13.0 to 17.0 wt.-%, most preferably in the range from 14.0 to 16.0 wt.-%.

It has been found that whilst the inclusion of fillers is known to improve the mechanical properties of polypropylene compositions, they have considerable negative effects on the optical properties of the resultant compositions, and thus in the context of the present invention should be avoided, or at least minimized.

The heterophasic polypropylene composition (C) according to the present invention preferably has a low content of mineral fillers. This mineral filler content can be evaluated through measuring the ash content of the heterophasic polypropylene composition (C). The heterophasic polypropylene composition (C) thus preferably has an ash content of less than 2.0 wt.-%, more preferably of less than 1.9 wt.-%, still more preferably of less than 1.8 wt.-%, most preferably of less than 1.7 wt.-%, relative to the total weight of the heterophasic polypropylene composition (C).

The heterophasic polypropylene composition (C) according to the present invention has a beneficial balance of stiffness and impact strength properties, despite the low mineral filler content and the relatively low amount of the amorphous phase. Furthermore, the heterophasic polypropylene composition (C) has a good total luminous transmittance.

As such, the heterophasic polypropylene composition (C) according to the present invention is characterized by its mechanical properties and transmittance.

The heterophasic polypropylene composition (C) preferably has a total luminous transmittance, measured according to ASTM D1003 on injected moulded plaques of 60×60×3 mm, in the range from 40 to 100%, more preferably in the range from 42 to 80%, still more preferably in the range from 44 to 60%, most preferably in the range from 46 to 50%.

The heterophasic polypropylene composition (C) preferably has a tensile modulus, measured according to ISO 527-1. -2 on a specimen of Tensile type 1B; 170×10×4 mm (ISO 1B), in the range from 1200 to 2000 MPa, more preferably in the range from 1300 to 1900 MPa, still more preferably in the range from 1400 to 1800 MPa, most preferably in the range from 1500 to 1700 MPa.

The heterophasic polypropylene composition (C) preferably has a Charpy Notched Impact Strength at 23° C., measured according to ISO 179 1eA using injection-moulded bar test specimens of 80×10×4 mm prepared in accordance with EN ISO 19069-2, in the range from 5.0 to 30.0 kJ/m$^2$, more preferably in the range from 7.0 to 25.0 kJ/m$^2$, still more preferably in the range from 8.0 to 20.0 kJ/m$^2$, most preferably in the range from 9.0 to 15.0 kJ/m$^2$.

The heterophasic polypropylene composition (C) preferably has a Charpy Notched Impact Strength at −20° C., measured according to ISO 179 1eA using injection-moulded bar test specimens of 80×10×4 mm prepared in accordance with EN ISO 19069-2, in the range from 3.5 to 20.0 kJ/m$^2$, more preferably in the range from 4.0 to 15.0 kJ/m$^2$, still more preferably in the range from 4.5 to 12.0 kJ/m$^2$, most preferably in the range from 5.0 to 10.0 kJ/m$^2$.

The heterophasic polypropylene composition (C) preferably has a puncture energy at 23° C., measured according to ISO 6603-2 using injection-moulded plaques of 60×60×3 mm and a test speed of 4.4 m/s, in the range from 30.0 to 60.0 J, more preferably in the range from 32.0 to 55.0 J, still more preferably in the range from 34.0 to 50.0 J, most preferably in the range from 36.0 to 45.0 J.

The heterophasic polypropylene composition (C) preferably has a puncture energy at −20° C., measured according to ISO 6603-2 using injection-moulded plaques of 60×60×3 mm and a test speed of 4.4 m/s, in the range from 20.0 to 100.0 J, more preferably in the range from 30.0 to 90.0 J, still more preferably in the range from 40.0 to 80.0 J, most preferably in the range from 50.0 to 70.0 J.

The heterophasic polypropylene composition (C) preferably has an energy to max force at 23° C., measured according to ISO 6603-2 using injection-moulded plaques of 60×60×3 mm and a test speed of 4.4 m/s, in the range from 15.0 to 40.0 J, more preferably in the range from 18.0 to 35.0 J, still more preferably in the range from 20.0 to 30.0 J, most preferably in the range from 21.0 to 25.0 J.

The heterophasic polypropylene composition (C) preferably has an energy to max force at −20° C., measured according to ISO 6603-2 using injection-moulded plaques of 60×60×3 mm and a test speed of 4.4 m/s, in the range from 20.0 to 60.0 J, more preferably in the range from 25.0 to 50.0 J, still more preferably in the range from 30.0 to 45.0 J, most preferably in the range from 35.0 to 40.0 J.

It is particularly preferred that the balance of properties is maximised. As such, it is preferred that the numerical values of the Charpy Notched Impact Strength (NIS), puncture energy, soluble fraction (SF) content and total luminous transmittance fulfil inequation (I):

$$\left(\frac{NIS \times \text{Puncture energy}}{SF}\right) \times \text{total luminous transmittance} \geq 900 \quad \text{(I)}$$

wherein the Charpy Notched Impact Strength is measured at 23° C. and expressed in kJ/m², 
the puncture energy is measured at 23° C. and expressed in J,
the soluble fraction (SF) content is given in wt.-%, and
the total luminous transmittance is given in %.

It is further preferred that the numerical values of the Charpy Notched Impact Strength (NIS), puncture energy, soluble fraction (SF) content and total luminous transmittance fulfil inequation (Ia):

$$\left(\frac{NIS \times \text{Puncture energy}}{SF}\right) \times \text{total luminous transmittance} \geq 950 \quad \text{(Ia)}$$

wherein the Charpy Notched Impact Strength is measured at 23° C. and expressed in kJ/m², 
the puncture energy is measured at 23° C. and expressed in J,
the soluble fraction (SF) content is given in wt.-%, and
the total luminous transmittance is given in %.

It is yet further preferred that the numerical values of the Charpy Notched Impact Strength (NIS), puncture energy, soluble fraction (SF) content and total luminous transmittance fulfil inequation (Ib):

$$\left(\frac{NIS \times \text{Puncture energy}}{SF}\right) \times \text{total luminous transmittance} \geq 1000 \quad \text{(Ib)}$$

wherein the Charpy Notched Impact Strength is measured at 23° C. and expressed in kJ/m², 
the puncture energy is measured at 23° C. and expressed in J,
the soluble fraction (SF) content is given in wt.-%, and
the total luminous transmittance is given in %.

It is most preferred that the numerical values of the Charpy Notched Impact Strength (NIS), puncture energy, soluble fraction (SF) content and total luminous transmittance fulfil inequation (Ic):

$$\left(\frac{NIS \times \text{Puncture energy}}{SF}\right) \times \text{total luminous transmittance} \geq 1100 \quad \text{(Ic)}$$

wherein the Charpy Notched Impact Strength is measured at 23° C. and expressed in kJ/m², 
the puncture energy is measured at 23° C. and expressed in J,
the soluble fraction (SF) content is given in wt.-%, and
the total luminous transmittance is given in %.

It is also preferred that the numerical values of the Charpy Notched Impact Strength (NIS), puncture energy, soluble fraction (SF) content and total luminous transmittance fulfil inequation (II):

$$\left(\frac{NIS \times \text{Puncture energy}}{SF}\right) \times \text{total luminous transmittance} \geq 500 \quad \text{(II)}$$

wherein the Charpy Notched Impact Strength is measured at −20° C. and expressed in kJ/m²,
the puncture energy is measured at −20° C. and expressed in J,
the soluble fraction (SF) content is given in wt.-%, and
the total luminous transmittance is given in %.

It is further preferred that the numerical values of the Charpy Notched Impact Strength (NIS), puncture energy, soluble fraction (SF) content and total luminous transmittance fulfil inequation (IIa):

$$\left(\frac{NIS \times \text{Puncture energy}}{SF}\right) \times \text{total luminous transmittance} \geq 600 \quad \text{(IIa)}$$

wherein the Charpy Notched Impact Strength is measured at −20° C. and expressed in kJ/m²,
the puncture energy is measured at −20° C. and expressed in J,
the soluble fraction (SF) content is given in wt.-%, and
the total luminous transmittance is given in %.

It is yet further preferred that the numerical values of the Charpy Notched Impact Strength (NIS), puncture energy, soluble fraction (SF) content and total luminous transmittance fulfil inequation (IIb):

$$\left(\frac{NIS \times \text{Puncture energy}}{SF}\right) \times \text{total luminous transmittance} \geq 750 \quad \text{(IIb)}$$

wherein the Charpy Notched Impact Strength is measured at −20° C. and expressed in kJ/m²,
the puncture energy is measured at −20° C. and expressed in J,
the soluble fraction (SF) content is given in wt.-%, and the total luminous transmittance is given in %.

It is most preferred that the numerical values of the Charpy Notched Impact Strength (NIS), puncture energy, soluble fraction (SF) content and total luminous transmittance fulfil inequation (IIc):

$$\left(\frac{NIS \times \text{Puncture energy}}{SF}\right) \times \text{total luminous transmittance} \geq 900 \quad \text{(IIc)}$$

wherein the Charpy Notched Impact Strength is measured at −20° C. and expressed in kJ/m²,
the puncture energy is measured at −20° C. and expressed in J,
the soluble fraction (SF) content is given in wt.-%, and
the total luminous transmittance is given in %.

Article

In another aspect, the present invention is directed to the provision of an article that comprises the heterophasic polypropylene composition (C).

In particular, the article according to the present invention is an injection-moulded article, preferably an automotive article.

EXAMPLES

1. Definitions/Determination Methods

Melt Flow Rate

The melt flow rate (MFR) is determined according to ISO 1133-1 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg. The $MFR_2$ of polyethylene is determined at a temperature of 190° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Quantification of Polyethylene Microstructure by $^{13}$C NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3s (Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382) and the RS-HEPT decoupling scheme (Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 2007 45, S1, S198). A total of 1024 (1k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (□+) at 30.00 ppm (J. Randall, Macromol. Sci., Rev. Macromol. Chem. Phys. 1989, C29, 201).

An exemplary procedure for ethylene octene copolymers is given below.

Poly(ethyelene-co-octene)—Octene Content

Characteristic signals corresponding to the incorporation of 1-octene were observed (J. Randall, Macromol. Sci., Rev. Macromol. Chem. Phys. 1989, C29, 201; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both $*B6$ and $*\beta B6B6$ sites of isolated (EEOEE) and isolated double non-consecutive (EEOEOEE) 1-octene sequences respectively. To compensate for the influence of the two $*\beta B6B6$ sites the integral of the $\beta\beta B6B6$ site at 24.7 ppm is used:

$$O = I_{*B6+*\beta B6B6} - 2*I_{\beta\beta B6B6}$$

When characteristic signals resulting from consecutive 1-octene incorporation (EEOOEE) were observed, such consecutive 1-octene incorporation was quantified using the integral of the signal at 40.57 ppm assigned to the $\alpha\alpha B6B6$ sites accounting for the number of reporting sites per comonomer:

$$OO = 2*I_{\alpha\alpha B6B6}$$

Characteristic signals resulting from non-consecutive 1-octene incorporation, i.e. EEOEOEE comonomer sequences, were also observed. Such non-consecutive 1-octene incorporation was quantified using the integral of the signal at 24.7 ppm assigned to the $\beta\beta B6B6$ sites accounting for the number of reporting sites per comonomer:

$$OEO = 2*I_{\beta\beta B6B6}$$

With no other signals indicative of other comonomer sequences observed the total 1-octene comonomer content was calculated based solely on the amount of isolated (EEOEE), double-consecutive (EEOOEE) and non-consecutive (EEOEOEE) 1-octene comonomer sequences:

$$O_{total} = O + OO + OEO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*I_{total})$$

The ethylene comonomer content was quantified using the integral of the bulk methylene (bulk) signals at 30.00 ppm. This integral included the γ and 4B6 sites from 1-octene as well as the $\delta^+$ sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 3*S]$$

The total mole fraction of 1-octene in the polymer was then calculated as:

$$fO = (O_{total})/(E_{total} + O_{total})$$

The total comonomer incorporation of 1-octene in mol percent was calculated from the mole fraction in the standard manner:

$$O[mol\%] = 100 * fO$$

The mole percent ethyelene incorporation was calculated from the formula:

$$E[mol\%] = 100 - O[mol\%].$$

Dynamic Mechanical Thermal Analysis (DMTA)

The glass transition temperature Tg is determined by dynamic mechanical thermal analysis (DMTA) according to ISO 6721-7. The measurements are done in torsion mode on compression moulded samples (40×10×1 mm) between −130° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm) between −130° C. and +150° C. with a heating rate of 2° C./min and a frequency of 1 Hz.

Xylene Cold Soluble (XCS)

Xylene Cold Soluble fraction at room temperature (XCS, wt.-%) is determined at 25° C. according to ISO 16152; 5$^{th}$ edition; 2005 Jul. 1.

Tensile Modulus

Tensile Modulus, tensile strength and tensile strength at break were determined according to ISO 527-2 (cross head speed=1 mm/min; test speed 50 mm/min at 23° C.) on a 1B specimen.

Notched Impact Strength (NIS)

The Charpy notched impact strength (NIS) was measured according to ISO 179 1eA at +23° C. or −20° C., using injection moulded bar test specimens of 80×10×4 mm prepared in accordance with EN ISO 19069-2.

Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution in 1,2,4-trichlorobenzene (1,2,4-TCB) at 160° C., crystallization at 40° C. and re-dissolution in 1,2,4-TCB at 160° C. as shown in FIG. 1b. Quantification of SF and CF and determination of ethylene content (C2) are achieved by means of an infrared detector (IR4) and an online 2-capillary viscometer is used for the determination of the intrinsic viscosity (iV).

IR4 detector is a multiple wavelength detector measuring IR absorbance at two different bands (CH$_3$ stretching vibration (centred at approx. 2960 cm$^{-1}$) and CH$_x$ stretching vibration (2700-3000 cm$^{-1}$)) which can be used to determine of the concentration and the ethylene content in ethylene-propylene copolymers. The IR4 detector is calibrated with series of 8 EP copolymers with known ethylene content in the range of 2 wt.-% to 69 wt.-% (determined by $^{13}$C-NMR) and each at various concentrations, in the range of 2 and 13 mg/ml. To account for both features, concentration and ethylene content at the same time for various polymer concentration expected during Crystex analyses the following calibration equations were applied:

$$Conc = a + b*Abs(CH) + c*(Abs(CH_x))^2 + d*Abs(CH_3) + e*(Abs(CH_3)^2 f*Abs(CH_x)*Abs(CH_3) \quad \text{(Equation 1)}$$

$$CH_3/1000C = a + b*Abs(CH_x) + c*Abs(CH_3) + d*(Abs(CH_3)/Abs(CH_x)) + e*(Abs(CH_3)/Abs(CH_x))^2 \quad \text{(Equation 2)}$$

The constants a to e for equation 1 and a to f for equation 2 were determined by using least square regression analysis.

The CH$_3$/1000 C is converted to the ethylene content in wt.-% using following relationship:

$$\text{Wt.-\% (Ethylene in EP Copolymers)} = 100 - CH_3/1000TC*0.3 \quad \text{(Equation 3)}$$

Amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per IS016152. XS calibration is achieved by testing various EP copolymers with XS content in the range 2-31 Wt %. The determined XS calibration is linear:

$$\text{Wt.-\% XS} = 1.01*\text{Wt.-\% SF} \quad \text{(Equation 4)}$$

Intrinsic viscosity (IV) of the parent EP copolymer and its soluble and crystalline fractions are determined with a use of an online 2-capillary viscometer and are correlated to corresponding IV's determined by standard method in decalin according to ISO 1628-3. Calibration is achieved with various EP PP copolymers with IV=2-4 dL/g. The determined calibration curve is linear:

$$IV(dL/g) = a*Vsp/c \quad \text{(equation 5)}$$

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm. To avoid sample degradation, polymer solution is blanketed with the N2 atmosphere during dissolution.

As shown in a FIGS. 1a and b, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are measured (Wt % SF, Wt % C2, IV).

$^{13}$C NMR Spectroscopy-Based Determination of C2 Content for the Calibration Standards Quantitative $^{13}$C{$^1$H} NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour.

Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sββ+Sβγ+Sβδ+0.5(Saβ+Saγ)) Through the use of this set of sites the corresponding integral equation becomes E=0.5($I_H$+$I_G$+0.5 ($I_C$+$I_D$)) using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E[mol %]=100*fE. The weight percent comonomer incorporation was calculated from the mole fraction: E[wt %]100*(fE*28.06)/(fE*28.06)+((1−fE)*42.08))

Ash Content

The ash content of the polymer was determined by combusting the polymer in a weighed platinum crucible. About 100 grams of polymer is weighed into the crucible. The crucible is then heated in a Bunsen burner flame so that the polymer slowly burns. After the polymer is completely burned the crucible is cooled, dried and weighed. The ash content is then the weight of the residue divided by the weight of the polymer sample. At least two measurements are made and if the difference between the measurements is more than 7 ppm then a third measurement is made.

Puncture Energy and Energy to Max Force

Puncture energy and Energy to max Force were determined on plaques with dimensions 60×60×3 mm³ machined from injection-molded plaques using an instrumented falling weight impact testing according to ISO 6603-2. The test was performed at either 23° C. or −20° C. (as indicated) with a lubricated tip with a diameter of 20 mm and impact velocity of 4.4 mm/s. Six specimens were tested for each sample and the resulting six force-deflection curves were used to calculate the mean value for energy to maximum force and puncture energy. In addition impact failure type was evaluated. ISO6603-2 defines the following impact failure types, the number in brackets was assigned to calculate a numeric value for impact failure (mean value derived from six tested samples):

YD yielding (zero slope at maximum force) followed by deep drawing (1)
YS yielding (zero slope at maximum force) followed by (at least partially) stable cracking (2)
YU yielding (zero slope at maximum force) followed by unstable cracking (3)
NY no yielding (4)

Total Luminous Transmittance and Haze

The optical properties of the polypropylene (total luminous transmittance and haze) were determined on plaques with dimensions 60×60×3 mm³ machined from injection-molded plaques and measured according to ASTM D1003.

Intrinsic Viscosity

The intrinsic viscosity (iV) is measured according to DIN ISO 1628/1, October 1999, in Decalin at 135° C.

2. Experimental a) Polymerisation of Heterophasic Propylene Ethylene Copolymers

The heterophasic propylene ethylene copolymers used in the present invention were polymerized using techniques well known in the art, using polymerization conditions given in Table 1.

The catalyst used for PP1 and PP2 was an emulsion-type Ziegler-Natta catalyst, being identical to the catalyst employed in the polymerization of the inventive examples of WO 2017/148970 A1.

The catalyst used for PP3 was Avant ZN180M, provided by LyondellBasell.

For each of PP1, PP2 and PP3, the cocatlayst was TEAL and the external donor was dicyclopentyldimethoxysilane (Donor D).

Following polymerization under the conditions given in Table 1, the reactor-made polymers were additivated with standard polypropylene additives, as is indicated at the bottom of Table 1, thus generating the final additivated PP1, PP2 and PP3, the properties of which are given in Table 2.

TABLE 1

| Polymerization conditions | | | | |
|---|---|---|---|---|
| Parameter | | PP1 | PP2 | PP3 |
| Prepolymerization | | | | |
| temperature | [° C.] | 28 | 30 | 28 |
| pressure | [kPa] | 45 | 55 | 45 |
| Al/donor ratio | [mol/mol] | 5 | 5 | 5 |
| residence time | [h] | 0.2 | 0.2 | 0.2 |
| Loop | | | | |
| temperature | [° C.] | 75 | 80 | 70 |
| pressure | [kPa] | 45 | 55 | 45 |
| residence time | [h] | 0.4 | 0.5 | 0.4 |
| ethylene feed | [kg/h] | — | — | — |
| H2/C3 ratio | [mol/kmol] | 9 | 4.8 | 2.4 |
| GPR 1 | | | | |
| temperature | [° C.] | 80 | 80 | 80 |
| pressure | [kPa] | 18 | 23 | 15 |
| residence time | [h] | 0.9 | 1.0 | 0.7 |

TABLE 1-continued

| Polymerization conditions | | | | |
|---|---|---|---|---|
| Parameter | | PP1 | PP2 | PP3 |
| C2/C3-ratio | [mol/kmol] | 0 | 0 | 0 |
| H2/C3 ratio | [mol/kmol] | 45 | 65 | 11 |
| GPR 2 | | | | |
| temperature | [° C.] | 80 | 80 | 75 |
| pressure | [kPa] | 16 | 19 | 14 |
| residence time | [h] | 1.6 | 1.5 | 0.1 |
| C2/C3 | [mol/kmol] | 0.3 | 350 | 500 |
| H2/C2 ratio | [mol/kmol] | 0.3 | 50 | 130 |
| GPR 3 | | | | |
| temperature | [° C.] | 80 | — | 80 |
| pressure | [kPa] | 14 | — | 14 |
| residence time | [h] | 1.0 | — | 0.4 |
| H2/C2 ratio | [mol/kmol] | 66 | — | 7.2 |
| C2/C3 ratio | [mol/kmol] | 345 | — | 300 |
| Compounding | | | | |
| Talc | [wt. %] | 1.90 | 0.70 | 0.50 |
| GlySt | [wt. %] | 0.40 | 0.30 | 0.15 |
| Irganox B 215 | [wt. %] | 0.15 | 0.10 | 0.10 |
| CaSt | [wt. %] | 0.05 | 0.05 | 0.10 |

Talc HM2 manufactured by IMI-Fabi (Italy) having a median particle size d50 of 2.4 μm, a cutoff particle size d95 of 7.7 μm and a specific surface of 21 m$^2$/g.
GlySt Glycerol Stearate, CAS-No 31556-31-1, is commercially available from Danisco (DuPont Group)
Irganox B 215 A blend of 2:1 Irgafox 168 and Irganox 1010, acting as process and long-term thermal stabilizer, commercially available from BASF SE
CaSt Calcium Stearate, CAS-No 1592-23-0, is commercially available from Faci

TABLE 2

Properties of additivated heterophasic propylene ethylene copolymers

| Property | | PP1 | PP2 | PP3 |
|---|---|---|---|---|
| MFR$_2$ | [g/10 min] | 35.0 | 12.0 | 4.0 |
| C2 | [wt.-%] | 7.0 | 10.3 | 11.2 |
| SF | [wt.-%] | 15.4 | 23.3 | 20.4 |
| C2(SF) | [wt.-%] | 35.9 | 35.9 | 39.5 |
| IV(SF) | [dl/g] | 2.67 | 3.25 | 3.28 |
| CF | [wt.-%] | 84.6 | 76.7 | 79.6 |
| C2(CF) | [wt.-%] | 1.73 | 2.77 | 4.05 |
| IV(CF) | [dl/g] | 1.33 | 1.58 | 2.10 |
| IV(SF)/IV(CF) | | 2.01 | 2.06 | 1.56 |
| XCS | [wt.-%] | 16.0 | 24.0 | 21.0 |
| C2(XCS) | [wt.-%] | 38.0 | 36.0 | 45.2 |
| IV(XCS) | [dl/g] | 2.88 | 3.51 | 3.70 | b) Blended Compositions

Inventive and comparative compositions were prepared according to the recipes given in Table 3. The additives were added in the form of 2.0 wt.-% of an additive dryblend. The inventive and comparative examples were produced by melt-blending the components in a co-rotating twin-screw extruder Coperion ZSK18. The temperature profile from hopper to die of 20-190-200-220-220-190-170-200° C. and a screw speed of 400 rpm were applied. The polymer melt mixture was discharged and pelletized.

PP4 is the commercially available automotive polypropylene grade EE001AI, available from Borealis AG.

LDPE is the commercially available low-density polyethylene CA9150, having a melt flow rate MFR$_2$ of 15.0 g/10 min and a density of 915 kg/m$^3$, available from Borealis AG.

PL is the commercially available ethylene-octene plastomer Queo 0201, having a melt flow rate MFR$_2$ of 1.1 g/10 min, a density of 902 kg/m$^3$ and a 1-octene content of 4.8 mol-%, available from Borealis AG.

The properties of the final compositions are given in Table 4.

TABLE 3

Compounded compositions

| Component | | IE1 | IE2 | IE3 | CE1 | CE2 | CE3 |
|---|---|---|---|---|---|---|---|
| PP1 | [wt %] | 76 | 76 | 76 | 100 | 73.7 | — |
| PP2 | [wt %] | 12 | — | 12 | — | 11.6 | — |
| PP3 | [wt %] | — | 12 | — | — | — | — |
| PP4 | [wt %] | — | — | — | — | — | 100 |
| LDPE | [wt %] | — | — | 10 | — | — | — |
| PL | [wt %] | 10 | 10 | — | — | 9.7 | — |
| Talc | [wt %] | — | — | — | — | 3.0 | — |
| Songnox 1076 SB | [wt %] | 0.15 | 0.15 | 0.15 | — | 0.15 | — |
| MILLAD NX8000 | [wt %] | 0.40 | 0.40 | 0.40 | — | 0.40 | — |
| Irgafos 168 | [wt %] | 0.15 | 0.15 | 0.15 | — | 0.15 | — |
| GlySt | [wt %] | 0.30 | 0.30 | 0.30 | — | 0.30 | — |
| CaSt | [wt %] | 0.15 | 0.15 | 0.15 | — | 0.15 | — |
| MB | [wt %] | 0.85 | 0.85 | 0.85 | — | 0.85 | — |

Talc Jetfine 3 CA having a median particle size d50 of 1.0 μm and a top-cut particle size d95 of 3.5 μm, commercially available from Imerys, France
Songnox 1076 SB Octadecyl 3-(3',5'-di-t-butyl-4-hydroxyphenyl)propionate, CAS-No 2082-79-3, is commercially available from Songwon
Irgafos 168 Tris (2,4-di-t-butylphenyl phosphite), CAS-No 31570-04-4, is commercially available from BASF SE
GlySt Glycerol Stearate, CAS-No 31556-31-1, is commercially available from Danisco (DuPont Group)
CaSt Calcium Stearate, CAS-No 1592-23-0, is commercially available from Faci
MB is HC001A-B1, a polypropylene produced by Borealis AG, Austria, having an MFR$_2$ of about 2 g/10 min and a Tm of 160° C. and used to prepare the additive dryblend prior to feeding it.

TABLE 4

Properties of Inventive and Comparative Examples

| | | IE1 | IE2 | IE3 | CE1 | CE2 | CE3 |
|---|---|---|---|---|---|---|---|
| MFR$_2$ | [g/10 min] | 23 | 19 | 26 | 35 | 23 | 13 |
| C2 | [wt.-%] | 15.2 | 15.4 | 15.0 | 6.4 | 15.4 | 22.2 |
| SF | [wt.-%] | 16.5 | 15.7 | 15.9 | 15.4 | 15.7 | 26.2 |
| C2(SF) | [wt.-%] | 36.0 | 36.7 | 35.9 | 35.7 | 35.7 | — |
| IV(SF) | [dl/g] | 2.79 | 2.69 | 2.56 | 2.67 | 2.57 | — |
| CF | [wt.-%] | 83.5 | 84.3 | 84.1 | 84.6 | 84.3 | 73.8 |
| C2(CF) | [dl/g] | 11.7 | 11.9 | 11.5 | 1.7 | 12.4 | — |
| IV(CF) | [wt.-%] | 1.43 | 1.52 | 1.36 | 1.33 | 1.41 | — |
| IV(SF)/IV(CF) | | 1.95 | 1.77 | 1.88 | 2.01 | 1.82 | — |
| XCS | [wt.-%] | 17.4 | 15.3 | 15.9 | 16.0 | 15 | — |
| C2(XCS) | [wt.-%] | 38.1 | 39.4 | 39.2 | 38.0 | 39.4 | — |
| IV(XCS) | [dl/g] | 3.34 | 3.05 | 3.02 | 2.88 | 3.05 | — |
| Ash content | [wt.-%] | 1.60 | 1.35 | 1.50 | 1.90 | 3.25 | 7.00 |
| Total luminous transmittance | [%] | 47 | 48 | 44 | 48 | 39 | 29 |
| Tensile Modulus | [MPa] | 1530 | 1550 | 1550 | 1700 | 1670 | 1470 |

TABLE 4-continued

Properties of Inventive and Comparative Examples

|  |  | IE1 | IE2 | IE3 | CE1 | CE2 | CE3 |
|---|---|---|---|---|---|---|---|
| Charpy NIS @ 23° C. | [kJ/m$^2$] | 10.4 | 9.2 | 8.1 | 5.6 | 8.9 | 14.0 |
| Charpy NIS @ −20° C. | [kJ/m$^2$] | 5.2 | 5.3 | 4.2 | 3.3 | 4.6 | 4.8 |
| Puncture Energy @ 23° C. | [J] | 39.4 | 39.9 | 43.3 | 35.2 | 34.9 | 38.1 |
| Puncture Energy @ −20° C. | [J] | 61.0 | 60.0 | 47.7 | 14.2 | 25.9 | 54.9 |
| Energy to Max Force @ 23° C. | [J] | 21.4 | 21.6 | 23.5 | 25.5 | 23.3 | 21.3 |
| Energy to Max Force @ −20° C. | [J] | 36.0 | 37.0 | 33.1 | 12.8 | 17.8 | 32.1 |
| (NIS*PE*transmittance)/SF @ 23° C. |  | 1166 | 1120 | 969 | 614 | 771 | 591 |
| (NIS*PE*transmittance)/SF @ −20° C. |  | 903 | 972 | 553 | 146 | 296 | 292 |

As can be seen from Table 4, the inventive compositions have a superior balance of stiffness, impact properties and optical properties. The inventive compositions have surprisingly good impact properties considering the relatively low SF content, which allows for high stiffness. In addition (although not described in Table 4) all of the inventive examples exhibited only YD yield behavior at 23° C., i.e. deep drawing following the zero slope at maximum force, which is beneficial for automotive applications. As can be seen by comparing the inventive examples with CE1, the addition of HECO2 (i.e. PP2 or PP3) and a polymer of ethylene (i.e. LDPE or PL) results in improved mechanical properties, in particular impact properties. Comparison of IE1 and CE1 shows the deleterious impact of mineral fillers on the optical properties of the compositions, showing that the use of these fillers, which are often used to improve the mechanical properties, should be avoided. Finally, the inventive compositions have superior optical properties to similar compositions previously used for similar automotive applications (i.e. CE3).

The invention claimed is:

1. A heterophasic polypropylene composition (C) comprising:
   a) 60.0 to 85.0 wt. % of a first heterophasic propylene ethylene copolymer (HECO1), having:
      i) a crystalline fraction (CF) determined according to CRYSTEX QC method ISO 6427-B, present in an amount in the range from 75.0 to 92.0 wt. %, relative to the total weight of HECO1;
      ii) a soluble fraction (SF) determined according to CRYSTEX QC method ISO 6427-B, present in an amount in the range from 8.0 to 25.0 wt. %, relative to the total weight of HECO1;
      iii) an intrinsic viscosity of the soluble fraction (IV(SF)) in the range from 2.00 to 4.00 dl/g;
   b) 5.0 to 20.0 wt. % of a second heterophasic propylene ethylene copolymer (HECO2), being different to the first heterophasic propylene ethylene copolymer (HECO1), having
      i) a soluble fraction (SF) determined according to CRYSTEX QC method ISO 6427-B, present in an amount in the range from 15.0 to 30.0 wt. %, relative to the total weight of HECO2;
      ii) an intrinsic viscosity of the soluble fraction (IV(SF)) in the range from 2.5 to 5.0 dl/g; and
   c) 5.0 to 20.0 wt. % of a polymer of ethylene (PE), being selected from an ethylene-based plastomer and an LDPE, having a density in the range from 895 to 925 kg/m$^3$;
   wherein the heterophasic polypropylene composition (C) has a melt flow rate MFR$_2$, measured according to ISO 1133-1 at 230° C. at a load of 2.16 kg, in the range from 15.0 to 40.0 g/10 min, and a soluble fraction (SF) determined according to CRYSTEX QC method ISO 6427-B, present in an amount in the range from 5.0 to 23.0 wt. % relative to the total weight of the heterophasic polypropylene composition (C), and
   wherein the combined amounts of the first heterophasic propylene ethylene copolymer (HECO1), the second heterophasic propylene ethylene copolymer (HECO2) and the polymer of ethylene (PE) are greater than or equal to 95 wt. %, relative to the total weight of the heterophasic polypropylene composition (C).

2. The heterophasic polypropylene composition (C) according to claim 1, having an ash content of equal to or less than 2.0 wt. %.

3. The heterophasic polypropylene composition (C) according to claim 1, having one or more of the following properties:
   i) an intrinsic viscosity of the soluble fraction (IV(SF)) in the range from 2.00 to 3.50 dl/g;
   ii) an ethylene content of the soluble fraction (C2(SF)), measured by Infrared Spectroscopy during CRYSTEX analysis, in the range from 25.0 to 50.0 wt. %;
   iii) an intrinsic viscosity of the crystalline fraction (IV(CF)) in the range from 1.00 to 2.00 dl/g;
   iv) an ethylene content of the crystalline fraction (C2(CF)), measured by Infrared Spectroscopy during CRYSTEX analysis, in the range from 5.0 to 20.0 wt. %;
   v) a ratio between the intrinsic viscosity of the soluble fraction and the intrinsic viscosity of the crystalline fraction (IV(SF)/IV(CF)) in the range from 1.40 to 3.00; and
   vi) a total ethylene content (C2), measured by Infrared Spectroscopy during CRYSTEX analysis, in the range from 10.0 to 20.0 wt. %.

4. The heterophasic polypropylene composition (C) according to claim 1, wherein the first heterophasic propylene ethylene copolymer (HECO1) has one or more of the following properties:
   i) an ethylene content of the soluble fraction (C2(SF)), measured by Infrared Spectroscopy during CRYSTEX analysis, in the range from 20.0 to 60.0 wt. %;
   ii) an intrinsic viscosity of the crystalline fraction (IV(CF)) in the range from 1.00 to 2.00 dl/g;
   iii) an ethylene content of the crystalline fraction (C2(CF)), measured by Infrared Spectroscopy during CRYSTEX analysis, in the range from 0.5 to 5.0 wt. %; and
   iv) a ratio between the intrinsic viscosity of the soluble fraction and the intrinsic viscosity of the crystalline fraction (IV(SF)/IV(CF)) in the range from 1.00 to 3.00.

5. The heterophasic polypropylene composition (C) according to claim 1, wherein the first heterophasic propylene ethylene copolymer (HECO1) has one or more of the following properties:
- i) a melt flow rate $MFR_2$, measured according to ISO 1133-1 at 230° C. at a load of 2.16 kg, in the range from 15.0 to 50.0 g/10 min; and
- ii) a total ethylene content (C2), measured by Infrared Spectroscopy during CRYSTEX analysis, in the range from 3.0 to 15.0 wt. %.

6. The heterophasic polypropylene composition (C) according to claim 1, wherein the second heterophasic propylene ethylene copolymer (HECO2) has one or more of the following properties:
- i) a melt flow rate $MFR_2$, measured according to ISO 1133-1 at 230° C. at a load of 2.16 kg, in the range from 1.0 g/10 min to 20.0 g/10 min;
- ii) a total ethylene content (C2), measured by Infrared Spectroscopy during CRYSTEX analysis, in the range from 8.0 to 15.0 wt. %;
- iii) an ethylene content of the soluble fraction (C2(SF)), measured by Infrared Spectroscopy during CRYSTEX analysis, in the range from 20.0 to 60.0 wt. %;
- iv) an intrinsic viscosity of the crystalline fraction (IV (CF)) in the range from 1.00 to 2.50 dl/g;
- v) an ethylene content of the crystalline fraction (C2 (CF)), measured by Infrared Spectroscopy during CRYSTEX analysis, in the range from 0.5 to 7.0 wt. %; and
- vi) a ratio between the intrinsic viscosity of the soluble fraction and the intrinsic viscosity of the crystalline fraction (IV(SF)/IV(CF)) in the range from 1.00 to 2.50.

7. The heterophasic polypropylene composition (C) according to claim 1, wherein the ratio of the melt flow rates $MFR_2$, measured according to ISO 1133-1 at 230° C. at a load of 2.16 kg, of the first heterophasic propylene ethylene copolymer (HECO1) and the second heterophasic propylene ethylene copolymer (HECO2), $MFR_2$(HECO1)/$MFR_2$ (HECO2), is at least 2.0.

8. The heterophasic polypropylene composition (C) according to claim 1, wherein the polymer of ethylene (PE) has a melt flow rate $MFR_2$, measured according to ISO 1133-1 at 190° C. at a load of 2.16 kg, in the range from 0.5 g/10 min to 30.0 g/10 min.

9. The heterophasic polypropylene composition (C) according to claim 1, wherein the polymer of ethylene (PE) is an ethylene-based plastomer (PL), wherein the ethylene-based plastomer has one or more of the following properties:
- i) a melt flow rate $MFR_2$, measured according to ISO 1133-1 at 190° C. at a load of 2.16 kg, in the range from 0.5 g/10 min to 10.0 g/10 min;
- ii) a density in the range from 895 to 908 kg/m$^3$;
- iii) comonomer(s) selected from C3 to C10 alpha-olefins; and
- iv) a comonomer content, measured by quantitative $^{13}$C-NMR analysis, in the range from 3.0 to 6.0 mol %.

10. The heterophasic polypropylene composition (C) according to claim 1, wherein the polymer of ethylene (PE) is a low density polyethylene (LDPE), wherein the low density polyethylene has either of the following properties:
- i) a melt flow rate $MFR_2$, measured according to ISO 1133-1 at 190° C. at a load of 2.16 kg, in the range from 10.0 g/10 min to 30.0 g/10 min; and
- ii) a density in the range from 908 to 925 kg/m$^3$.

11. The heterophasic polypropylene composition (C) according to claim 1, having a total luminous transmittance, measured according to ASTM D1003 on injected moulded plaques of 60×60×3 mm, in the range from 40 to 100%.

12. The heterophasic polypropylene composition (C) according to claim 1, having one or more of the following properties:
- i) a tensile modulus, measured according to ISO 527-1. -2 on a specimen of Tensile type 1B; 170×10×4 mm (ISO 1B), in the range from 1200 to 2000 MPa;
- ii) a Charpy Notched Impact Strength at 23° C., measured according to ISO 179 1eA using injection moulded bar test specimens of 80×10×4 mm prepared in accordance with EN ISO 19069, in the range from 5.0 to 30.0 kJ/m$^2$;
- iii) a Charpy Notched Impact Strength at −20° C., measured according to ISO 179 1eA using injection moulded bar test specimens of 80×10×4 mm prepared in accordance with EN ISO 19069, in the range from 3.5 to 20.0 kJ/m$^2$;
- iv) a puncture energy at 23° C., measured according to ISO 6603-2 using injection moulded plaques of 60×60×3 mm and a test speed of 4.4 m/s, in the range from 30.0 to 60.0 J;
- v) a puncture energy at −20° C., measured according to ISO 6603-2 using injection moulded plaques of 60×60×3 mm and a test speed of 4.4 m/s, in the range from 20.0 to 100.0 J;
- vi) an energy to max force at 23° C., measured according to ISO 6603-2 using injection moulded plaques of 60×60×3 mm and a test speed of 4.4 m/s, in the range from 15.0 to 40.0 J; and
- vii) an energy to max force at −20° C., measured according to ISO 6603-2 using injection moulded plaques of 60×60×3 mm and a test speed of 4.4 m/s, in the range from 20.0 to 60.0 J.

13. The heterophasic polypropylene composition (C) according to claim 1, wherein the numerical values of the Charpy Notched Impact Strength (NIS), puncture energy, soluble fraction (SF) content, determined according to CRYSTEX QC method ISO 6427-B, and total luminous transmittance fulfil inequation (I):

$$((NIS \times Puncture\ energy)/SF) \times total\ luminous\ transmittance \geq 900 \quad (I)$$

wherein the Charpy Notched Impact Strength is measured at 23° C. and expressed in kJ/m$^2$,
the puncture energy is measured at 23° C. and expressed in J,
the soluble fraction (SF) content is given in wt. %, and
the total luminous transmittance is given in %.

14. The heterophasic polypropylene composition (C) according to claim 1, wherein the numerical values of the Charpy Notched Impact Strength (NIS), puncture energy, soluble fraction (SF) content, determined according to CRYSTEX QC method ISO 6427-B, and total luminous transmittance fulfil inequation (II):

$$((NIS \times Puncture\ energy)/SF) \times total\ luminous\ transmittance \geq 500 \quad (II)$$

wherein the Charpy Notched Impact Strength is measured at −20° C. and expressed in kJ/m$^2$,
the puncture energy is measured at −20° C. and expressed in J,
the soluble fraction (SF) content is given in wt. %, and
the total luminous transmittance is given in %.

15. An injection-moulded article, comprising the heterophasic polypropylene composition (C) according to claim 1.

16. The injection-moulded article according to claim 15, wherein the injection moulded article is an automotive article.

\* \* \* \* \*